US 6,655,586 B1

(12) United States Patent
Back et al.

(10) Patent No.: US 6,655,586 B1
(45) Date of Patent: *Dec. 2, 2003

(54) SYSTEMS AND METHODS THAT DETECT A PAGE IDENTIFICATION USING EMBEDDED IDENTIFICATION TAGS

(75) Inventors: Maribeth J. Back, San Francisco, CA (US); Jonathan R. Cohen, San Francisco, CA (US)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/512,768

(22) Filed: Feb. 25, 2000

(51) Int. Cl.$^7$ ................................................ G06K 5/00
(52) U.S. Cl. ........................ 235/382; 235/375; 434/117
(58) Field of Search ................. 235/382, 375, 235/439, 462.13, 472.02; 434/308, 309, 317

(56) References Cited

U.S. PATENT DOCUMENTS

| | | | | | |
|---|---|---|---|---|---|
| 4,669,122 | A | * | 5/1987 | Swinbanks | 365/49 |
| 5,191,329 | A | * | 3/1993 | Samreus | 341/20 |
| 5,274,757 | A | * | 12/1993 | Miyoshi et al. | 395/146 |
| 5,367,623 | A | * | 11/1994 | Iwai et al. | 395/157 |
| 5,631,883 | A | * | 5/1997 | Li | 369/31 |
| 5,900,876 | A | * | 5/1999 | Yagita et al. | 345/530 |
| 6,005,482 | A | * | 12/1999 | Moran et al. | 340/568.8 |
| 6,109,526 | A | * | 8/2000 | Ohanian et al. | 235/462.45 |
| 6,135,503 | A | * | 10/2000 | Lob et al. | 283/63.1 |
| 6,262,662 | B1 | * | 7/2001 | Back et al. | 340/572.1 |
| 6,269,238 | B1 | * | 7/2001 | Iggulden | 434/317 |
| 6,324,070 | B1 | * | 11/2001 | McMullen et al. | 235/375 |
| 6,330,976 | B1 | * | 12/2001 | Dymetman et al. | 235/487 |
| 6,345,764 | B1 | * | 2/2002 | Knowles | 235/472.01 |
| 6,421,524 | B1 | * | 7/2002 | Padgett | 434/317 |
| 6,477,528 | B1 | * | 11/2002 | Takayama | 707/5 |

FOREIGN PATENT DOCUMENTS

AU  9350680  * 2/1994  ................. 235/375

OTHER PUBLICATIONS

"Augmenting Real–World Objects: A Paper–Based Audio Notebook", Lisa J. Stifelman, Proceedings of CHI 96, http://media.mit.edu/people/lisa/chi96.html, Jan. 7, 2000.

"Applying Electric Field Sensing to Human–Computer Interfaces", Thomas G. Zimmerman et al., CHI '95 Proceedings, http://www.acm.org/sigchi/chi95/Electronic/documents/papers/tgz_bdy.htm, Feb. 24, 2000.

"QProx QTM1001A: Charge Transfer ('QT') Sensor Module", Quantum Research Group, Mar. 1998.

"Electric Field Sensing for Graphical Interfaces", Joshua Smith et al., Physics and Media Group, MIT Media Lab, pp. 1–17, May 1998.

"Bridging Physical and Virtual Worlds with Electronic Tags", Roy Want et al., Proceedings of CHI '99, pp. 1–9, Apr. 1999.

"BiStatix Whitepaper", BiStatix Technology, http://www.motorola.com/LMPS/Indala/bistatix.htm, Feb. 12, 2000.

"Tag–it: Reader System Series 320 Reference Guide", Technology by Texas Instruments, Feb. 1999.

* cited by examiner

*Primary Examiner*—Daniel St. Cyr
(74) *Attorney, Agent, or Firm*—Oliff & Berridge, PLC

(57) ABSTRACT

Identifier tags are embedded in pages of a document. Each of these identifier tags identifies the particular page that a reader is viewing. By correlating the currently read page to information stored memory, dynamic content corresponding to the currently read page can be activated. This dynamic content can include, for example, lighting, sound effects, environmental conditions, or the like.

21 Claims, 3 Drawing Sheets

SYSTEMS AND METHODS THAT DETECT A PAGE IDENTIFICATION USING EMBEDDED IDENTIFICATION TAGS

BACKGROUND OF THE INVENTION

1. Field of Invention

This invention is related to detecting a page identification. In particular, this invention is directed towards systems and methods for controlling dynamic content based on a page identification.

2. Description of Related Art

A plethora of systems are available that detect or identify a particular page of a document. In particular, the systems generally involve mechanical switch-based techniques that are prone to false readings, or optical systems that have particular lighting or visual requirements. Alternatively, there are systems that require the reader to perform a specific function, for example, pressing a button, scanning, for example with a pen, a bar code, or passing a page through a reader to identify a page in, for example, a book.

SUMMARY OF THE INVENTION

Current page identification techniques require a user to perform an action that is not typical during interaction with a document. Furthermore, current systems are prone to false readings and can be easily affected by environmental conditions.

Accordingly, the systems and methods of this invention embed or otherwise associate identification tags to the paper of a page. A dedicated tag identification reader is affixed, for example, to the binding of, for example, a book. As a page is turned, the tag identification reader detects which pages are within sensible range. Knowing what pages, i.e., identification tags, are in the sensible range of the tag identification reader, the viewed page can be determined. Therefore, the user is able to interact with the document naturally, and is not required to perform any actions that are not typical when interacting with a document, such as a book.

Furthermore, the systems and methods of this invention, since they are capable of accurately detecting a page identification, can further control dynamic content based on the detected page identification. For example, upon detecting the page identification, dynamic content such as music, sound effects, voice recordings, spot lighting, ambient room lighting, effects on a computer, such as dynamic text, colors, patterns, graphics, or the like, temperature, chair motion control, volume control, pan, fade, web page access, or the like, can be activated to enhance the reading experience.

This invention provides systems and methods that detect a page identification.

This invention separately provides systems and methods that control dynamic content based on a detected page identification.

This invention additionally provides systems and methods that allow for page identification without requiring actions from a user beyond that which is required for normal interaction with a document.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following Figures, wherein.

DETAILED DESCRIPTION OF PREFERRED EMBODIMENTS

One or more page identification tags, such as a radio frequency identification tags, are embedded in, or otherwise associated with, one or more pages in a document, such as a book. Corresponding identification tag readers are placed in, for example, the book's cover. As the pages of the document are turned, the pages, and hence the identification tags, pass into and out of the sensible range of the identification tag readers. Thus, as one or more pages of, for example, a book, are turned, the identification tag reader(s) detect the current page being viewed by a reader.

Having detected the currently viewed page, the systems and methods of this invention can correlate the detected page identification tag and a page identification, which corresponds to one or more physical pages. This page identification can control instructions that affect dynamic content, such as environmental conditions.

Figure 1:
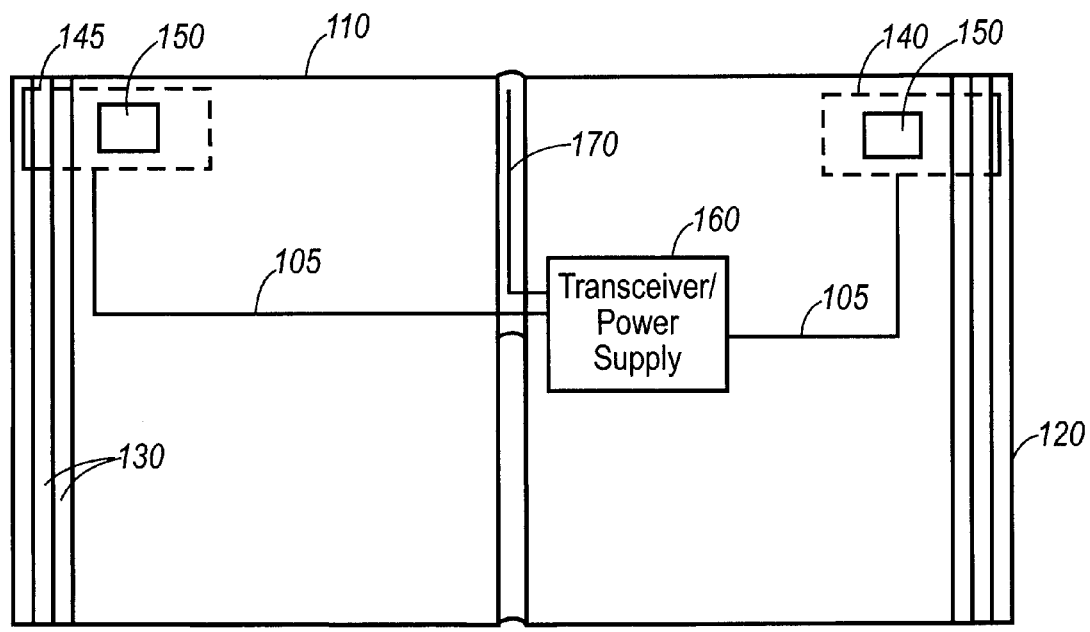
FIG. 1 illustrates an exemplary environmental block diagram of the page identification system according to this invention.
Figure 1:
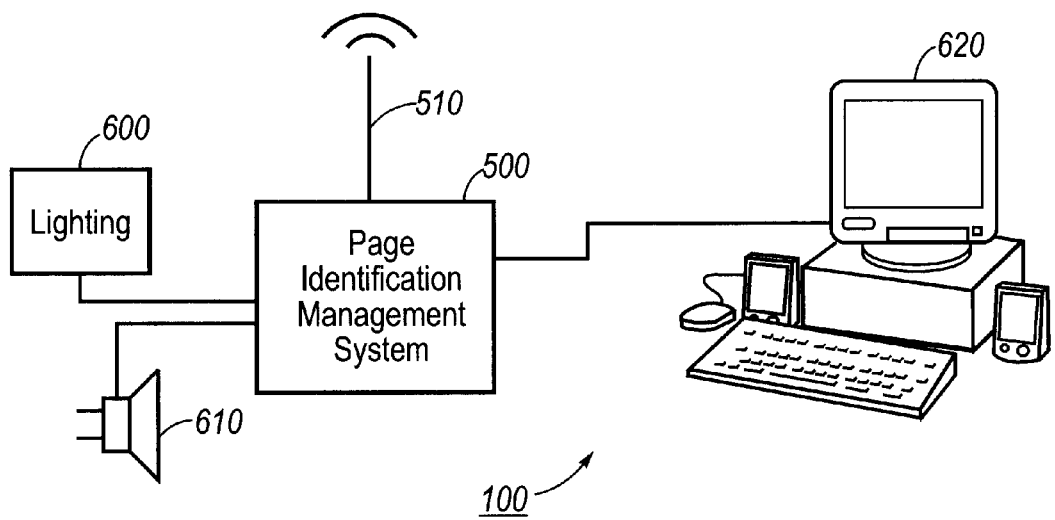

FIG. 1 illustrates an environmental block diagram of an exemplary page identification system according to this invention. The page identification system 100 comprises a document 110, such as a book, a cover 120, one or more pages 130, one or more identification tag readers 140, 145, one or more identification tags 150, a transceiver/power supply 160, links 105, 170 and 510, such as an antenna, a page identification management system 500, and one or more devices capable of providing dynamic content, such as a lighting device 600, a sound producing device 610 and a computer 620.

The document 110 comprises a cover 120 and one or more pages 130. The one or more pages have an associated identification tag 150. The identification tag(s) 150 contain information that correspond to one or more pages of a document. Associated with the cover 120 are one or more tag identification readers 140 and 145 that sense the presence of the one or more identification tags 150. Thus, as the pages 130 of the document 110 are turned, the identification tags 150 enter into and out of the sensible area of the identification tag readers 140 and 145. The identification tag reader(s) 140 and 145, are connected, via link 105, to a transceiver/power supply 160, which is in turn connected, via links 170 and 510, such as antennas, to the page identification management system 500. The page identification management system 500 receives page identifications associated with the detected identification tags 150.

Having received the page identifications associated with the detected identification tags, the page identification management system 500 determines whether the page identifications have any related dynamic content. If there is dynamic content associated with the page identifications, the page identification management system 500 forwards control information to the appropriate dynamic content device, such as the lighting device 600, the sound producing device 610, the personal computer 620, or the like.

While the exemplary embodiment illustrated in FIG. 1 shows the identification tag readers and the identification tags on top of one another, it should be appreciated that many different geometrical configurations are possible, such as offset, staggered, or the like, depending on, for example, the type of identification tag, the type of identification tag reader, the document thickness, the paper thickness and the sensitivity of one or more of the identification tag and the identification tag reader. Furthermore, it should be appreciated that the tag readers can be located anywhere, fore example, in a piece of furniture, such as a table. In general, the relationship between the identification tag(s) and the identification tag reader(s) can be any configuration which allows communication between the devices.

Figure 2:
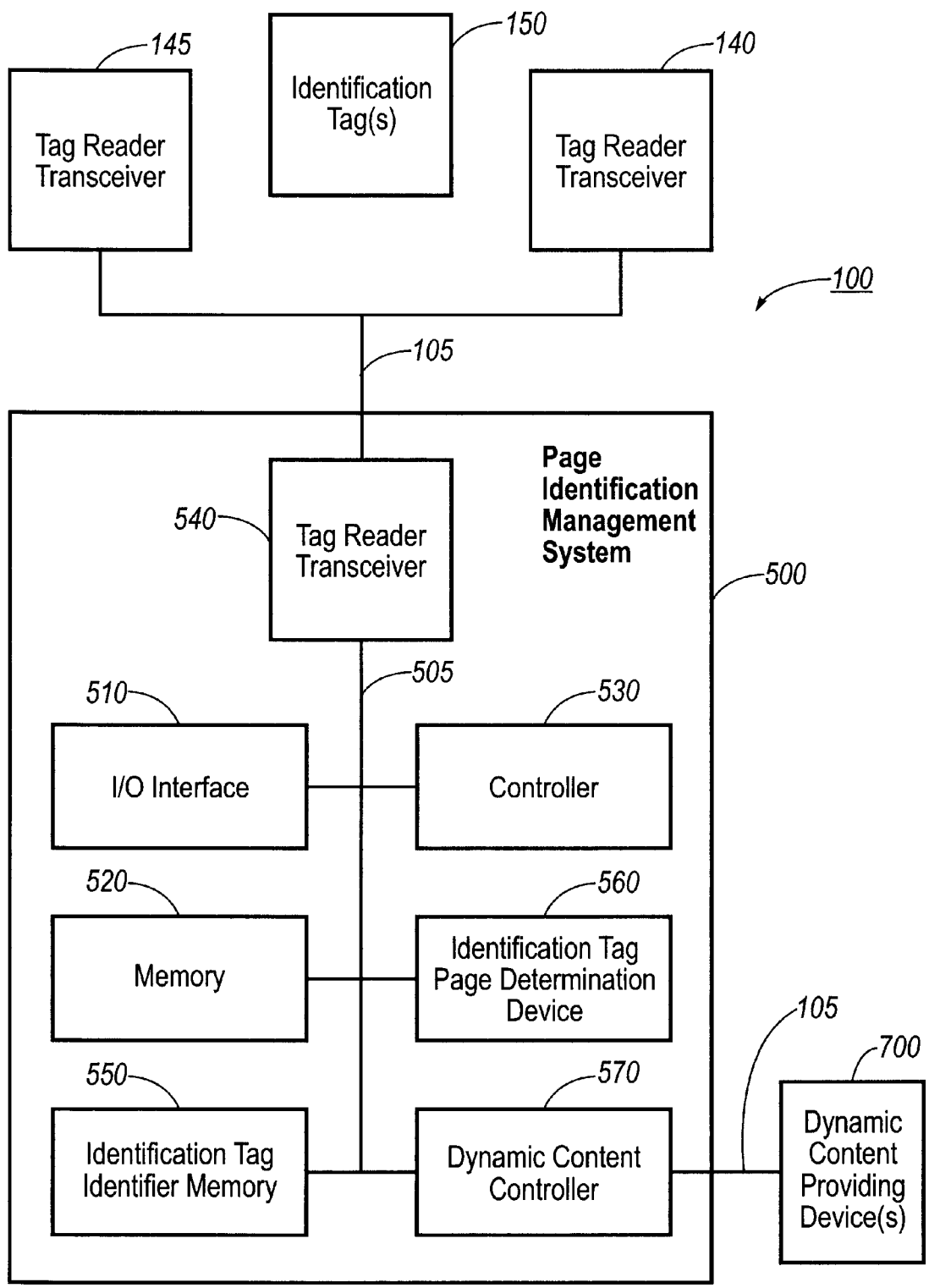
FIG. 2 is a functional block diagram showing an exemplary embodiment of the page identification system according to this invention.

FIG. 2 illustrates a functional block diagram of an exemplary page identification system 100 according to this invention. The page identification system 100 comprises a page identification management system 500, comprising an I/O interface 510, a memory 520, a controller 530, a tag reader transceiver 540, an identification tag identifier memory 550, an identification tag page determination device 560 and a dynamic content controller 570. The page identification management system 500 is connected, via link 105, to one or more tag reader transceivers 140, 145 that sense the presence, or absence, of one or more identification tags 150. Additionally, the page identification management system 500 is connected, via link 105, to one or more dynamic content providing devices 700.

The identification tags 150 can be a radio frequency identification (RFID) product, such as the Tag-it™ system developed by Texas Instruments,® outlined in the Tag-it™ Reader System Series 320 Reference Guide, incorporated herein by reference in its entirety, or the BiStatix™ system by Motorola,® outlined in the BiStatix™ Whitepaper, herein incorporated by reference in its entirety. Alternatively, the identification tags can be a physical device such as a micro-chip or other device capable of carrying information based on its mechanical, electrical or magnetic properties. For example, the identification tag can be an ultrasonic transmitter and the tag reader transceiver and ultrasonic receiver. Upon placing the identification tag in the sensible area of the tag reader transceiver, the tag reader transceiver reads the identification associated with the identification tag.

Alternatively, the identification tag could maintain, transmit or respond to an electric or magnetic field. The tag reader transceiver would then produce an electromagnetic field into which the identification tag can be placed. When the identification tag is placed in a sensible area of the tag reader transceiver, the identification tag becomes capacitively, inductively, or otherwise electro- or electromechanically coupled to the tag reader transceiver, and the information can be extracted from the identification tag and forwarded to the page identification management system.

In summary, the identification tag and identification tag reader(s) can be any device, or combination thereof, which are capable of respectively storing at least one page identification which can then be read by the tag reader transceiver.

The links 105 and 505 can be any wired or wireless link or any other known or later developed element(s) that is capable of supplying electronic data to and from the connected elements.

In operation, one or more tag reader transceivers 140, 145 which are embedded in, for example, the cover(s) of the book, detect the presence of one or more identification tags 150. Specifically, a tag reader transceiver can be embedded in both the front cover and the back cover of a book, illustrated as tag reader 145 and 140, respectively. Then, as a reader flips between the pages, the identification tags move, for example, from being in the sensible range of the back cover tag reader transceiver 140 to the sensible area of the front cover tag reader transceiver 145. As each tag reader transceiver 140 and/or 145 detect that an identification tag 150 has either come into or left the sensible area of the tag reader transceiver, a signal corresponding to that identification tag is forwarded to the page identification management system 500. In particular, one or more of the tag reader transceivers 140 and 145 forward, via link 105, a signal corresponding to the detected identification tag(s) 150.

Alternatively, a document, such as a book, may be provided with only one tag reader transceiver associated with the document. In this instance, as the tag reader transceiver detects an identification tag either entering or leaving its sensible range, the tag reader transceiver can forward a signal corresponding to the sensed identification tag(s) to the page identification management system 500. Furthermore, it should be appreciated that given variables such as book thickness, sensibility of the tag readers, detectability of the identification tags, relative geometry of the identification tag(s) and identification tag reader(s), or the like, one or more tag readers may be disbursed throughout a document as required.

Therefore, the tag reader transceiver 540 can receive a plurality of differing types of signals depending on the exact configuration of the tag reader transceivers within a document. Accordingly, it may be necessary for the controller 530, in cooperation with the I/O interface 510, the memory 520, the identification tag page determination device 560 and the identification tag identifier memory 550 to determine which page(s) are currently being viewed by a reader. Specifically, having received signals corresponding to one or more identification tags that are received from the one or more tag reader transceivers 140 and 145, the identification tag page determination device 560 can determine, with reference to the identification tag identifier memory 550, which page is currently being viewed. The identification tag identifier memory 550 stores a list of relationships between identification tags and pages of the document. Thus, the identification tag page determination device 560, with reference to the identification tag identifier memory, can determine a relationship between the identifier tags and the actual page(s) of the document.

Additionally, the identification tag page determination device 560, upon querying the identification tag identifier memory 540 to determine a page relationship for the sensed identification tag also determines if dynamic content is associated with the sensed identification tag. If dynamic content is associated with the sensed identification tag, the identification tag page determination device 560, cooperating with controller 530, via link 505, forwards a control signal to the dynamic content controller 570. The dynamic content controller 570, forwards the appropriate control information to one or more dynamic content providing device(s) 700 via link 105. The dynamic content providing device(s) 700 can be one or more, or a combination of, music, sound effects, voice recordings, spot lighting, ambient room lighting, effects on a computer, such as dynamic text, colors, patterns, graphics, multimedia presentations, or the like, temperature, chair motion control, volume control, pan, fade, web page access, or the like. In this manner, the dynamic content can be directly correlated to the page(s) viewed by a reader.

The identification tag identifier memory 550 stores information pertaining to the document being read. In particular, prior to reading a document, the page identifications and corresponding dynamic content identifications are uploaded to the identification tag identifier memory 550 via, for example, the I/O interface 510 and the link 505. This information can be uploaded in tablized form or any other known or later developed format that is capable of interfacing with the identification tag page determination device 560 and the dynamic content controller 570.

For example, Table 1 illustrates exemplary dynamic content that could be associated with the pages of a document.

TABLE 1

| Document | Page Identification | Dynamic Content |
| --- | --- | --- |
| February 13 Sunday Paper | 1 | Play sound byte |
| | 3 | Show multimedia restaurant advertisement on computer |
| | 89A | Retrieve theater schedule |
| | 127 | Obtain snow report |
| The Scary Book | 1–10 | Dim lights |
| | Chapter 15, all pages | Lower room temperature |
| | 147 | Play "breaking glass" |
| Law Review | 22 | Retrieve web page indicating case overturned |
| Textbook | 344 | Retrieve "pop quiz" web page |

For example, the page identification system according to this invention could be embedded in, for example, a television guide. Therefore, in a "view on demand" type television environment, as a reader peruses the pages of the television guide, previews of television shows associated with the page currently being viewed could be displayed. Alternatively, if the page identification systems of this invention were embedded in a newspaper, the user could interact with, for example, a web page that could provide dynamic content based on the currently viewed page. For example, upon purchasing a Sunday newspaper, a user could return home and download the identification tag information pertaining to the just purchased newspaper. This information can then be transferred, via any known or later developed technique, to the page identification management system 500 and stored in the identification tag identifier memory 550. Then, as previously discussed, as the pages of the newspaper are viewed, the page identification management system 500 determines what, if any, dynamic content is associated with the pages of the just purchased newspaper, and controls that content.

Furthermore, it is to be appreciated that the dynamic content associated with one or more identification tag need not be static. As previously discussed, new correlation's between identification tags and dynamic content can be downloaded and the identification tag identifier memory 550 updated with this information. Therefore, the systems and methods of this invention not only enable dynamic content to be associated with one or more pages of a document, but allow for that dynamic content to change.

In another exemplary embodiment of the systems and methods according to this invention, imaging you are reading a "choose your destination" type book. As you read the book, dynamic content associated with the chosen course of action is determined by the page identification management system 500: Dynamic content corresponding to the currently read page can then further heighten the reading experience.

Alternatively, the page identification systems and methods of this invention can be used to maintain a book's accuracy. For example, in the case of a scientific textbook, new discoveries are made every day. Alternatively, in the legal world, new precedents based on, for example, recently decided case law are rendering old precedents moot. Therefore, upon purchasing a book having the page identification system of this invention, the book can be kept current. Specifically, by updating the information stored in the identification tag identifier memory 550, new dynamic content can be retrieved, for example, from an associated web page, that indicates which portion(s) of the currently viewed page may be outdated. In particular, the dynamic content may be a call, via a web browser residing on a computer, to a specific uniform resource locator (URL).

Figure 3:
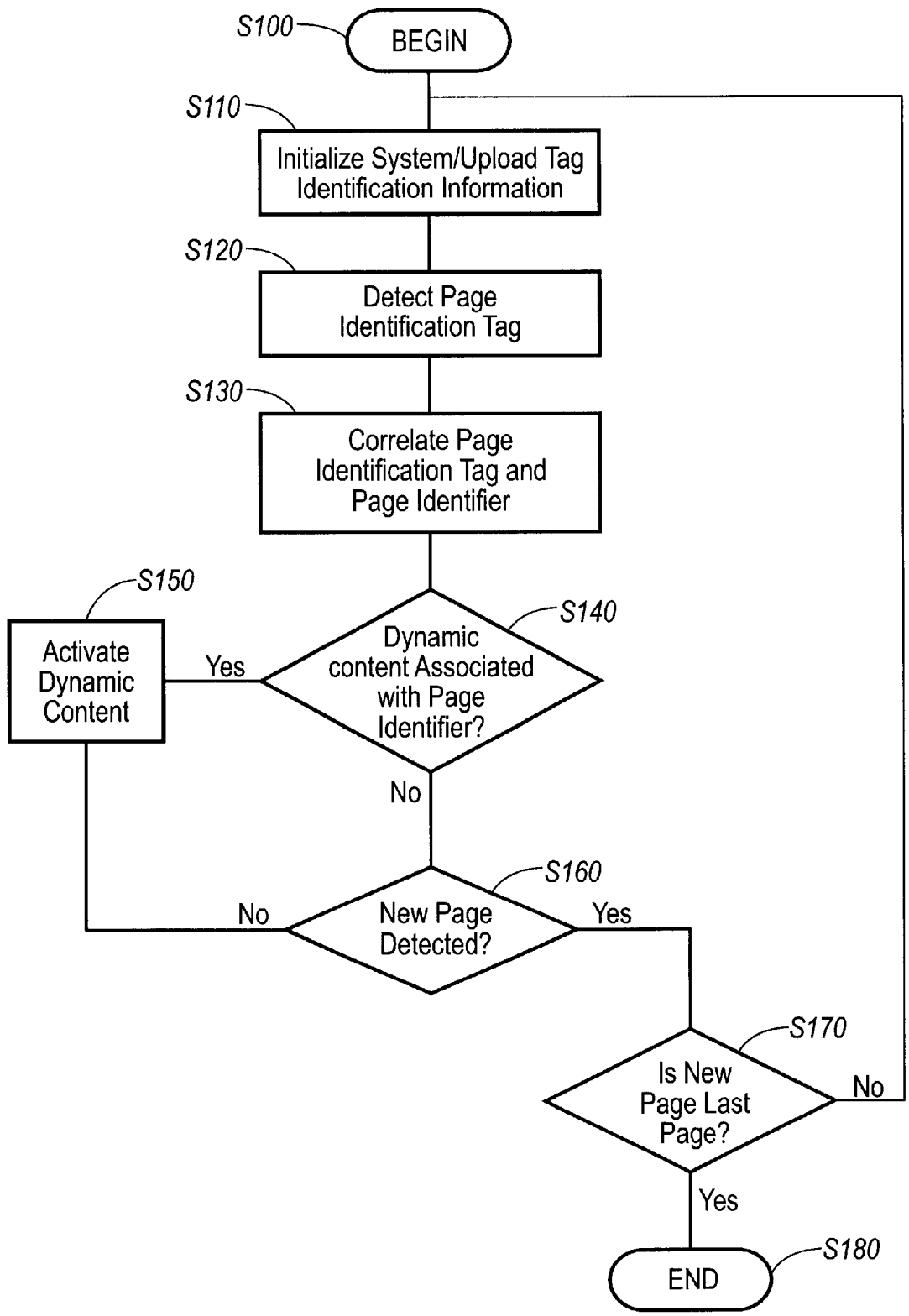
FIG. 3 is a flowchart outlining one exemplary embodiment of a method for detecting page identification according to this invention.

FIG. 3 illustrates the operation of the page identification system according to this invention. Specifically, control begins in step S100. Next, in step S110, the system is initialized and the tag identification information is uploaded to the system. Then, in step S120, the currently viewed page is determined based on the detected page identification tag. Control then continues to step S130.

In step S130, a correlation is made between the page identification tag and the page identification. Next, in step S140, a determination is made whether dynamic content is associated with the page identification. If dynamic content is associated with the page identification, control continues to step S150. Otherwise, control jumps to step S160.

In step S150, the dynamic content associated with the page identifier is activated. Control then continues to step S160.

In step S160, a determination is made whether a new page has been detected. If a new page has not been detected, control continues back to step S160. Otherwise, control jumps to step S170.

In step S170, a determination is made whether the newly detected page is the last page. If the newly detected page is not the last page, control jumps back to step S110. Otherwise, control continues to step S180 where the control sequence ends.

As shown in FIGS. 1–2, the page identification system is preferably implemented either on a single program general purpose computer or separate programmed general purpose computer, with associated tag reader transceiver devices. However, the page identification system can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowchart shown in FIG. 3 can be used to implement the page identification system according to this invention.

Furthermore, the disclosed method may be readily implemented in software using object or object-oriented software development environments that provide portable source code that can be used on a variety of computer or workstation hardware platforms. Alternatively, the disclosed page identification system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The page identification systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed method may be readily implemented as software executed on a programmed general purpose computer, a special purpose computer, a microprocessor, or the like. In this case, the methods and systems of this invention can be implemented as a routine embedded on a personal computer such as a JAVA® or CGI script, as a resource residing on a server or graphics workstation, as a routine embedded in a dedicated page identification systems, a web browser, a web TV interface, a PDA interface, an interactive document or the like. The page identification system can also be implemented by physically incorporating the systems and methods into a software and/or hardware system, such as the hardware and software systems of a personal computer or dedicated page identification system.

It is, therefore, apparent that there has been provided in accordance with the present invention, systems and methods for determining page identification and any corresponding dynamic text. While this invention has been described in conjunction with the preferred embodiments thereof, it is evident that many alternatives, modifications and variations be apparent to those skilled in the art. Accordingly, applicants intend to embrace all such alternatives, modifications and variations that follow in the spirit and scope of this invention.

What is claimed is:

1. A page identification system for use with a physical document that includes multiple pages, the page identification system comprising:
   at least one first identification tag that is associated with at least one first page of the multiple pages of the physical document;
   at least one second identification tag that is associated with at least one second page of the physical document;
   at least one identification tag reader that reads the at least one first identification tag when the at least one first page has been turned;
   a page identification management system that determines that the at least one first page is viewed by a user based upon the reading of the at least one identification tag reader;
   at least one dynamic content output device wherein the pace identification management system controls a dynamic content output based on the reading oil the at least one identification tag reader; and
   wherein the dynamic content is at least two of music, sound effects, voice recordings, spot lighting, ambient room lighting, temperature, chair motion control, volume control, pan, fade, web page access, and effects on a computer comprising dynamic text, colors, patterns, graphics and multimedia presentations.

2. The system of claim 1, further comprising:
   an identification tag identifier memory that stores associations between the identification tags and the at least one first and second pages of the document; and
   an identification tag page determination device that identifies at least one first page based on the associations.

3. The system of claim 2, wherein the identification tag identifier memory identifies dynamic content associated with the at least one currently viewed page.

4. The system of claim 3, further comprising a dynamic content controller that controls the at least one dynamic content output device based on the at least one first page.

5. The system of claim 1, wherein the at least one first and second identification tag is at least one of an electronic device, a capacitive device, an inductive device, an electromechanical device, a micro-machine, a micro-electromechanical device, an ultrasonic transmitting device or a microchip.

6. The system of claim 1, wherein the at least one identification tag reader is at least one of a an electronic sensing device, an electromechanical sensing device, an inductive sensing device, a capacitive sensing device, a microchip reader, a micro-machine device reader, a micro-electromechanical device reader or an ultrasonic reader.

7. The system of claim 1, wherein the page identification management system is capable of determining the page identification based just on a users interaction with the document.

8. A method for identifying pages for use with a physical document that includes multiple pages, the method comprising:
   associating at least one first identification tag with at least one first page of the multiple pages of the physical document;
   associating at least one second identification tag with at least one second page of the physical document;
   reading the at least one first identification tag;
   determining that the at least one first page is viewed by a user when the at least one first page has been turned, based upon the reading of the at least one first identification tag; and
   outputting a dynamic content based upon the reading of the at least one first identification tag, wherein the dynamic content is at least two of music, sound effects, voice recordings, spot lighting, ambient room lighting, temperature, chair motion control, volume control, pan, fade, web page access, and effects on a computer comprising, dynamic text, colors, patterns, graphics and multimedia presentations.

9. The method of claim 8, further comprising:
   retrieving an association between the at least one first identification tag and the at least one first page of the document; and
   identifying the at least one first page based on the association.

10. The method of claim 9, further comprising identifying at least one dynamic content associated with the at least one first page.

11. The method of claim 10, further comprising controlling at least one dynamic content providing device based on the at least one first page.

12. The method of claim 8, wherein the at least one first and second identification tags are at least one of an electronic device, a capacitive device, an inductive device, an electromechanical device, a micro-machine, a micro-electromechanical device, an ultrasonic transmitting device or a microchip.

13. The method of claim 8, wherein the at least one first and second identification tags are read by at least one of a an electronic sensing device, an electromechanical sensing device, an inductive sensing device, a capacitive sensing device, a microchip reader, a micro-machine device reader, a micro-electromechanical device reader or an ultrasonic reader.

14. The method of claim 8, wherein the page identification is determined based just on a users interaction with the document.

15. An information storage medium for use with a physical document that includes multiple pages comprising:

information that effects detection of at least one first identification tag that is associated with at least one first page of the multiple pages of the physical document;

information that effects detection of at least one second identification tag that is associated with at least one second page of the multiple pages of the physical document;

information that effects detection of the at least one first identification tag when the at least one first page has been turned;

information that correlates the at least one first identification tag with the at least one first page when the at least one first page is turned;

information that outputs a dynamic content based on the correlated information;

wherein the dynamic content is at least two of music, sound effects, voice recordings, spot lighting, ambient room lighting, temperature, chair motion control, volume control, pan, fade, web page access, and effects on a computer comprising, dynamic text, colors, patterns, graphics and multimedia presentations.

16. The information storage medium of claim 15, further comprising:

information that retrieves an association between the at least one first identification tag and the at least one first page; and information that identifies the at least one first page based on the association.

17. The information storage medium of claim 16, further comprising information that identifies dynamic content associated with the at least one first page.

18. The information storage medium of claim 17, further comprising information that controls at least one dynamic content output device based on the at least one first page.

19. The information storage medium of claim 15, wherein the at least one first and second identification tags are at least one of an electronic device, a capacitive device, an inductive device, an electromechanical device, a micro-machine, a micro-electromechanical device, an ultrasonic transmitting device or a microchip.

20. The information storage medium of claim 15, wherein the at least one first and second identification tag are read by at least one of a an electronic sensing device, an electromechanical sensing device, an inductive sensing device, a capacitive sensing device, a microchip reader, a micro-machine device reader, a micro-electromechanical device reader or an ultrasonic reader.

21. The information storage medium of claim 15, wherein the page identification is determined based just on a user's interaction with the document.

* * * * *